United States Patent [19]

Kirsch et al.

[11] Patent Number: 5,650,855
[45] Date of Patent: Jul. 22, 1997

[54] OFF-AXIS JOINT TRANFORM CORRELATOR

[75] Inventors: James C. Kirsch; Don A. Gregory, both of Huntsville, Ala.

[73] Assignee: The United States of America as represented by the Secretary of the Army, Washington, D.C.

[21] Appl. No.: 726,119

[22] Filed: Oct. 4, 1996

[51] Int. Cl.⁶ .................................................. G01B 11/00
[52] U.S. Cl. .............................. 356/394; 356/392; 356/71
[58] Field of Search ............................ 356/394, 71, 397, 356/388, 393, 392

[56] References Cited

U.S. PATENT DOCUMENTS 4,739,415  4/1988  Toyono et al. ...................... 358/296
5,015,867  5/1991  Siegel et al. ....................... 356/73.1 X
5,095,194  3/1992  Barbanell ............................ 235/379

*Primary Examiner*—Frank G. Font
*Assistant Examiner*—Reginald A. Ratiff
*Attorney, Agent, or Firm*—Hugh P. Nicholson; Freddie M. Bush; Hay Kyung Chang

[57] ABSTRACT

The off-axis joint transform correlator improves on the extant on-axis joint transform correlator by eliminating the requirement for a second laser frequency and the means for blocking the first laser frequency from propagating beyond a given point in the correlator. These eliminations are accomplished by using a beamsplitter and a mirror to bring a second portion of the first frequency at an angle to read the pattern information written onto a spatial light modulator by the first portion.

9 Claims, 2 Drawing Sheets

OFF-AXIS JOINT TRANFORM CORRELATOR

DEDICATORY CLAUSE

The invention described herein may be manufactured, used and licensed by or for the Government for governmental purposes without the payment to us of any royalties thereon.

BACKGROUND OF THE INVENTION

Joint transform correlation is a process for optically comparing a test pattern (representative of the test object) with a reference pattern (representative of the reference object) to determine the existence of similarity between the test and reference objects. Extant on-axis correlators, an example of which is diagrammed in FIG. 1, that use transmission devices, such as second spatial light modulator 213 in the filter plane, require two different frequencies of coherent light to operate. A beam of $\omega_1$ (write-beam) emanating from first laser 201 is needed to be transmitted through test pattern 227 and reference pattern 229 (together referred to as the input patterns). Even though in the figures the input patterns are depicted as separate from first spatial light modulator (SLM) 205, such depiction is for illustrative purposes only; but in practice, the input patterns reside on the first SLM. The first SLM can be something as simple as a transparency or slide containing the input pattern images or something as complex as a liquid crystal device wherein the pattern images are updated electronically. The first SLM encodes the images of the input patterns onto the beam of $\omega_1$ as the beam passes through the first SLM. The encoded beam is then further transmitted to impinge on first focusing lens 207 where Fourier transform occurs and the resultant fringe image is projected from the first focusing lens toward second spatial light modulator 213. At this point, $\omega_1$ is prevented from entering the rest of the system by use of filter 103; otherwise, $\omega_1$ simply adds noise to the entire system and degrades the performance of the correlator. Then, with beamsplitter 101 in place as shown, a beam of $\omega_2$ (read-beam) emanating from second laser 105 is allowed to propagate coaxially with $\omega_1$ through second spatial light modulator 213 and through filter 103 onto second focusing lens 217 where Fourier transform once again occurs. Needless to say, then, the filter must be suitable to block the passage of $\omega_1$ while allowing the passage of $\omega_2$. At this juncture, if there is a match between the test and the reference patterns, a correlation pattern emerges. The correlation pattern consists of a triad of dots: a large dot in the middle with a smaller dot on either side of it. If no match exists between the input patterns, only the large dot in the middle appears. Camera 219 may be used to receive the triad or the single-dot image from the second focusing lens and television monitor 223 connected to the camera may be used to display the correlation triad or the single-dot.

SUMMARY OF THE INVENTION

The off-axis joint transform correlator requires only a single frequency of coherent light which is initially divided into the write-beam and read-beam. This eliminates the need for a second laser. The read-beam is then brought in off-axis (not propagate in the same direction as the write beam) to read second spatial light modulator 213 whereon the fringe image has been written. This eliminates the need for the filter to block out the write-beam. What results is a simpler and less expensive correlator with increased transmission efficiency.

DESCRIPTION OF THE PREFERRED EMBODIMENT

Figure 1:
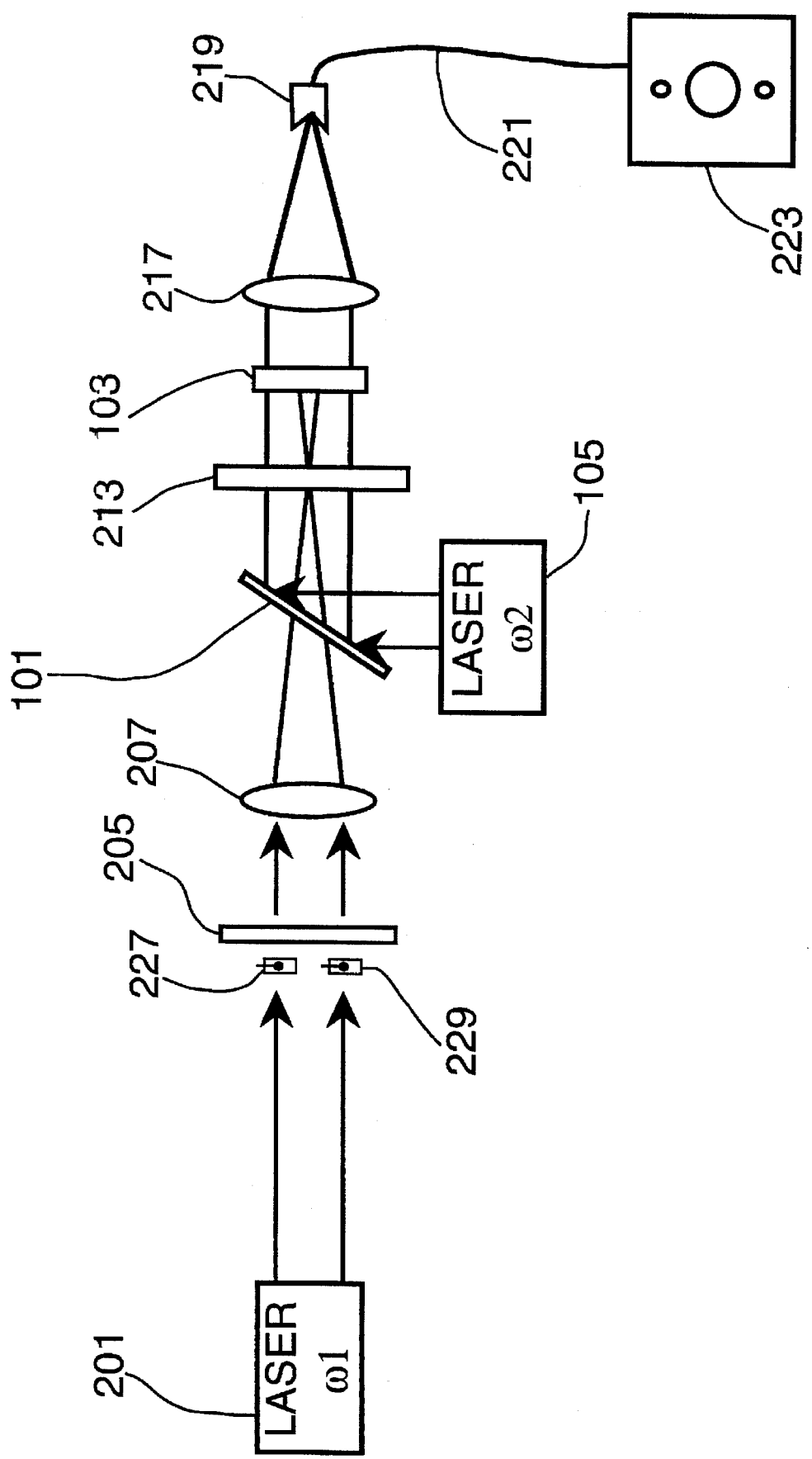
FIG. 1 shows the optical arrangement of an extant on-axis joint transform correlator.
Figure 2:
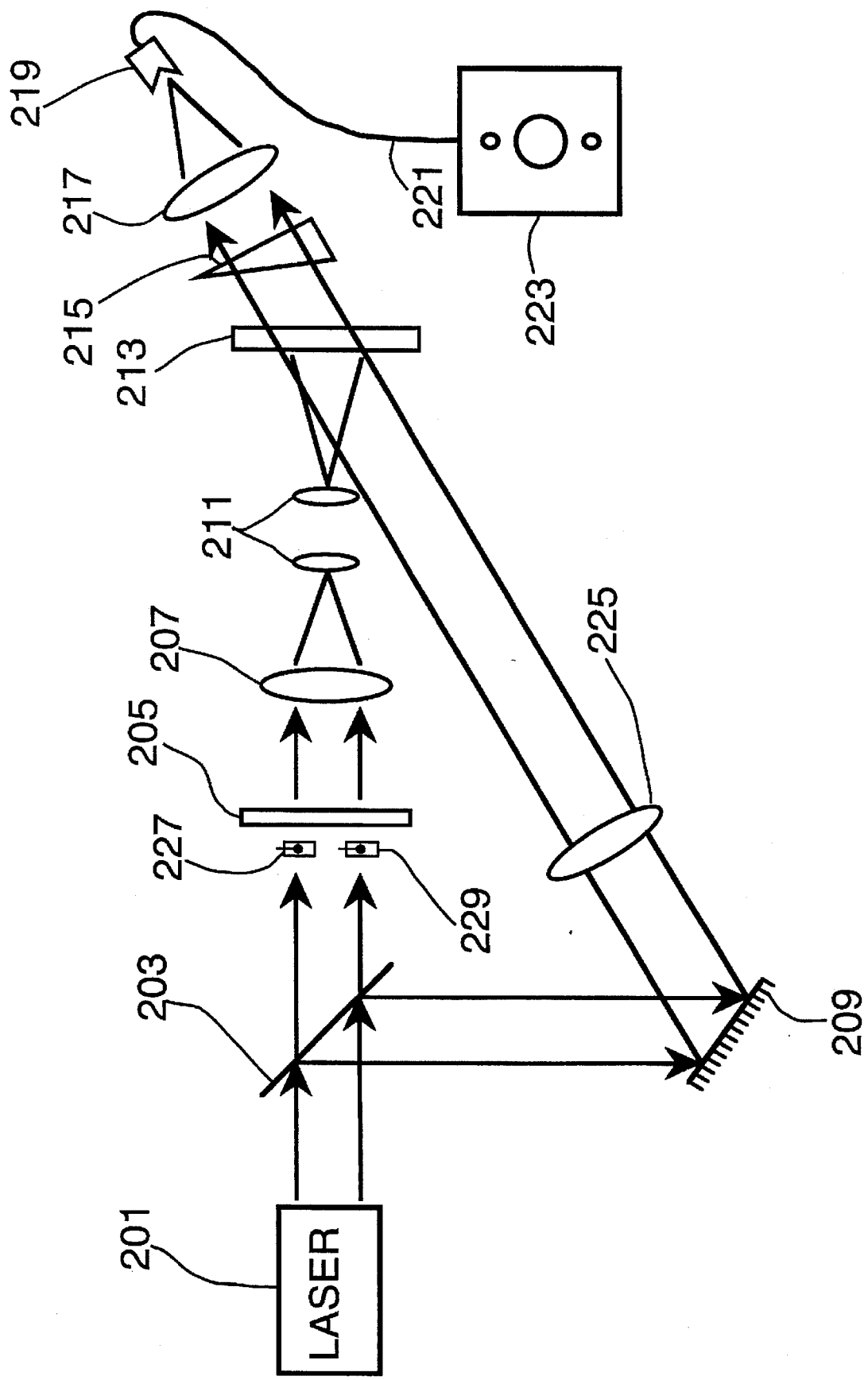
FIG. 2 is a diagram of the preferred embodiment of the off-axis joint transform correlator.

Now turning to the figures wherein like numbers denote like parts and arrows indicate the directions of optical travel: the operation of the off-axis joint transform correlator, as illustrated in FIG. 2, begins when first spatial light modulator (SLM) 205 containing thereon a pre-selected test pattern 227 and reference pattern 229 (together referred to as the input patterns) is positioned to be in the optical path of the write-beam (explained below) that emanates from laser 201 and the laser itself is activated. When activated, laser 201 emits a collimated laser beam of a given frequency which proceeds to beamsplitter 201 where it is divided into a write-beam and a read-beam. The write-beam is transmitted to impinge on first SLM 205 that contains test pattern 227 and reference pattern 229 while the read-beam, in its collimated state, is deflected to be incident on mirror 209. The first SLM encodes the images of the test and reference patterns onto the write-beam as the write-beam travels through the first SLM. The encoded write-beam then impinges on first focusing lens 207 which performs Fourier transform on the beam and focuses the resulting fringe image onto microscope objective 211. The microscope objective 211 magnifies the very fine fringe image and projects the fringe image onto second spatial light modulator (SLM) 213 where the fringe image functions like a diffraction grating. This is the accomplishment of the optical "writing" of the test and reference patterns onto the second SLM. Meanwhile the read-beam that is incident on mirror 209 is reflected thereby toward second SLM 213 where the read-beam combines with the write-beam and thereby "reads" the fringe image written thereon. If there is a similarity level of at least 80% between test pattern 227 and reference pattern 229, the combination of the write-beam and read-beam at the second SLM produces a correlation triad of dots consisting of a large dot in the middle with one smaller dot on either side of the large dot, as illustrated on television monitor 223. If the similarity level is insufficient, then only the large center dot appears. After the read-beam passes through the second SLM, the read-beam, now containing the image of either the dot triad or single dot, is Fourier transformed by second focusing lens 217 and focused onto television camera 219. The camera, in turn, transmits the correlation dot information via conventional electrical connection 221 to television monitor 223 to be displayed for easy viewing by the operator of the off-axis joint transform correlator. Wedge 215, placed as shown between second SLM 213 and second focusing lens 217, provides compensation for the apparent compression of the spatial frequencies in the correlation dot image due to the off-axis illumination of the read-beam. The wedge and second focusing lens 217 are positioned within the correlator linearly with respect to the optical path of the read-beam while they are at an angle with respect to the optical path of the write-beam. This angle prevents the write-beam from propagating beyond second SLM 217 and eliminates the requirement for color filter 103. It is noted that mirror 209 should be separated from beamsplitter 203 by a distance sufficient to allow the read-beam reflecting from the mirror to impinge on the second SLM without passing through any part of microscope objective 211. The angle formed at the second SLM by the write-beam and the read-beam should be greater than 0 degree and less than 90 degrees.

Although a particular embodiment and form of this invention has been illustrated, it is apparent that various modifications and embodiments of the invention may be made by those skilled in the art without departing from the scope and spirit of the foregoing disclosure. One such modification is placing converging lens 225 in the path of the read-beam between mirror 209 and second spatial light modulator 213 such that the read-beam converges at the point of the camera location. Such use of a converging lens eliminates the need for second focusing lens 217. Accordingly, the scope of the invention should be limited only by the claims appended hereto.

We claim:

1. An off-axis joint transform correlator for optically comparing a variable test pattern with a variable reference pattern, the test pattern and the reference pattern being representative of various pre-selected test objects and various pre-selected reference objects, respectively, to determine the level of similarity between a given pair of the test object and the reference object, said correlator comprising:

a laser for emitting a beam of pre-chosen frequency; a first focusing lens; a mirror; a beamsplitter positioned to receive and divide the beam emitted by said laser into a write-beam and a read-beam, said beamsplitter transmitting therethrough said write-beam to be incident on said first focusing lens while reflecting said read-beam to be incident on said mirror; a first spatial light modulator positioned between said beamsplitter and said first focusing lens such that said write-beam travels through said first modulator prior to being incident on said first focusing lens, said first modulator being adapted for containing thereon variable images of the test and reference patterns and being capable of encoding the images of the test and reference patterns onto said write-beam thusly travelling through the first modulator, said first focusing lens producing corresponding fringe image in response to incident light; a second spatial light modulator for receiving thereon said fringe image; microscope objective located between said first focusing lens and said second modulator, said microscope objective being suitable for receiving and magnifying said fringe image before projecting said fringe image onto said second modulator, said mirror being further positioned, with respect to said second modulator, so as to allow said read-beam reflecting from said mirror to be projected to impinge on said second modulator to combine thereat with said write-beam, such combination producing correlation dots, said dots varying in number in response to the level of similarity existing between the test and reference patterns.

2. An off-axis joint transform correlator as set forth in claim 1, wherein said correlator further comprises a television camera; a second focusing lens placed between said second modulator and said camera to focus said correlation dots onto said camera; and a monitor coupled to said camera to receive therefrom and display said correlation dots.

3. An off-axis joint transform correlator as set forth in claim 1, wherein said correlator further comprises a television camera for receiving said correlation dots from said second modulator; a monitor coupled to said camera for receiving therefrom and displaying said correlation dots and a converging lens, said converging lens being positioned between said mirror and said second modulator to cause said read-beam reflecting from said mirror to converge onto said camera after travelling through said second modulator.

4. A correlator as set forth in claim 2, wherein said correlator still further comprises an optical wedge, said wedge being placed between said second modulator and said second focusing lens to provide for optical pathlength correction for said read-beam.

5. A correlator as set forth in claim 4, wherein said second focusing lens and wedge are positioned so as to allow the passage therethrough of said read-beam while excluding the passage therethrough of said write-beam.

6. A correlator as set forth in claim 3, wherein said correlator still further comprises an optical wedge, said wedge being placed between said second modulator and said camera to provide for optical pathlength correction for said read-beam.

7. A correlator as set forth in claim 6, wherein said wedge is positioned so as to allow the passage therethrough of said read-beam while excluding the passage therethrough of said write-beam.

8. In a joint transform correlator for optically comparing a test pattern and a reference pattern, the patterns being descriptive of a pre-selected test object and a pre-selected reference object, respectively, the correlator having a first and a second spatial light modulators, a first and a second focusing lenses, a beamsplitter for dividing a beam into first and second portions, a first and a second lasers, a color filter and a means for displaying correlation dots, the number of dots being dependent on the level of similarity between the test and reference objects, an improvement for eliminating the second laser and the color filter, said improvement comprising:

a mirror positioned so as to receive from the beamsplitter the second portion of the light emanating from the first laser and reflect the second portion, at a slant with respect to the first portion, toward the second spatial light modulator to combine with the first portion thereat, such combination selectively producing a triad of dots, said triad being indicative of at least a given level of similarity between the test and reference objects; and an optical wedge, said wedge being placed between the second modulator and the second focusing lens to provide optical pathlength correction for the second portion.

9. An improvement as set forth in claim 8, wherein said slant is such that, at the second modulator, the first portion and the second portion form an angle that is greater than 0 degree but less than 90 degrees.

* * * * *